United States Patent
Nakashima et al.

(10) Patent No.: US 9,031,403 B2
(45) Date of Patent: May 12, 2015

(54) OPTICAL TRANSMISSION SYSTEM AND METHOD FOR MONITORING POLARIZATION DEPENDENT CHARACTERISTICS OF OPTICAL TRANSMISSION LINE

(71) Applicant: Fujitsu Limited, Kawasaki-shi, Kanagawa (JP)

(72) Inventors: Hisao Nakashima, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 87 days.

(21) Appl. No.: 13/915,675

(22) Filed: Jun. 12, 2013

(65) Prior Publication Data
US 2014/0029938 A1   Jan. 30, 2014

(30) Foreign Application Priority Data
Jul. 26, 2012   (JP) .................. 2012-166088

(51) Int. Cl.
*H04B 10/08*   (2006.01)
*H04B 10/04*   (2006.01)
(Continued)

(52) U.S. Cl.
CPC ............. *H04B 10/07* (2013.01); *G01M 11/336* (2013.01); *H04B 10/07951* (2013.01); *G01M 11/337* (2013.01)

(58) Field of Classification Search
CPC .. H04B 10/07951; H04B 10/73; H04B 10/75; H04B 10/79; H04B 10/07; H04B 110/07; G01M 11/336; G01M 11/33; G01M 11/337; G01M 11/30–11/31
USPC .................. 398/15, 16, 28, 29, 33, 147, 162, 398/182–201, 9, 25, 140, 202–214; 356/73.1, 364–370
See application file for complete search history.

(56) References Cited

U.S. PATENT DOCUMENTS 5,227,623 A * 7/1993 Heffner .......................... 250/225
5,298,972 A * 3/1994 Heffner .......................... 356/364
(Continued)

FOREIGN PATENT DOCUMENTS

EP   1 865 302 A1   12/2007
JP   8-274713   10/1996
(Continued)

OTHER PUBLICATIONS

Heffner, Automated Measurement of Polarization Mode Dispersion Using Jones Eigenanalysis, May 1992, Instruments and Photonics Laboratory HPL-92-63, All Document.*
(Continued)

*Primary Examiner* — Ken Vanderpuye
*Assistant Examiner* — Dibson Sanchez
(74) *Attorney, Agent, or Firm* — Staas & Halsey LLP

(57) ABSTRACT

A method includes sweeping an optical frequency of an optical signal by an optical transmitter controlling an electric-field information signal corresponding to a transmitted signal, providing different polarization states for individual frequencies of the optical signal by the optical transmitter controlling a mixture of a first electric-field information signal corresponding to a first transmitted signal and a second electric-field information signal corresponding to a second transmitted signal, obtaining, for individual frequencies of the optical signal, polarization dependent characteristics corresponding to different frequencies, when the optical transmitter sweeps the frequency of the optical signal, by an optical receiver calculating a polarization-dependent characteristic of an optical transmission line between the optical transmitter and the optical receiver, based on items of received-electric-field information corresponding to the different polarization states, and obtaining statistical information of a polarization state of the optical transmission line, based on the polarization dependent characteristics, with the optical receiver.

8 Claims, 14 Drawing Sheets

(51) Int. Cl.
H04B 10/06 (2006.01)
G01N 21/00 (2006.01)
H04B 10/07 (2013.01)
G01M 11/00 (2006.01)
H04B 10/079 (2013.01)

(56) References Cited

U.S. PATENT DOCUMENTS

| | | | | |
|---|---|---|---|---|
| 5,717,489 | A | * | 2/1998 | Ozeki et al. .................... 356/364 |
| 6,144,450 | A | * | 11/2000 | Jopson et al. .................. 356/364 |
| 6,229,606 | B1 | * | 5/2001 | Way et al. ...................... 356/364 |
| 6,380,533 | B1 | * | 4/2002 | Jopson et al. .................. 250/225 |
| 6,888,625 | B2 | * | 5/2005 | Anderson ..................... 356/73.1 |
| 7,330,667 | B2 | * | 2/2008 | Fells .............................. 398/193 |
| 7,382,984 | B2 | * | 6/2008 | McNicol et al. .............. 398/147 |
| 7,382,985 | B2 | * | 6/2008 | Roberts et al. ................ 398/159 |
| 7,676,161 | B2 | * | 3/2010 | Roberts et al. ................ 398/194 |
| 7,768,630 | B2 | * | 8/2010 | Sarchi et al. .................. 356/73.1 |
| 8,406,635 | B2 | * | 3/2013 | Nakashima et al. ........... 398/158 |
| 8,478,135 | B2 | * | 7/2013 | Xie ................................ 398/208 |
| 2004/0070759 | A1 | * | 4/2004 | Anderson ..................... 356/364 |
| 2004/0071381 | A1 | | 4/2004 | Szafraniec et al. | |
| 2004/0197103 | A1 | * | 10/2004 | Roberts et al. ................ 398/159 |
| 2008/0079941 | A1 | * | 4/2008 | Dong et al. ................... 356/365 |
| 2008/0100828 | A1 | * | 5/2008 | Cyr et al. ...................... 356/73.1 |
| 2009/0214201 | A1 | | 8/2009 | Oda et al. | |
| 2010/0111531 | A1 | * | 5/2010 | Tanimura et al. .............. 398/65 |
| 2010/0189445 | A1 | * | 7/2010 | Nakashima et al. ........... 398/152 |
| 2011/0170869 | A1 | * | 7/2011 | Mandai et al. .................. 398/65 |
| 2012/0141130 | A1 | * | 6/2012 | Nakashima et al. ............ 398/82 |
| 2012/0148260 | A1 | * | 6/2012 | Akiyama et al. .............. 398/184 |
| 2012/0170929 | A1 | * | 7/2012 | Xie et al. ........................ 398/33 |
| 2012/0269513 | A1 | * | 10/2012 | Abe ................................ 398/65 |

FOREIGN PATENT DOCUMENTS

| | | |
|---|---|---|
| JP | 2004-138615 | 5/2004 |
| JP | 2009-198364 | 9/2009 |
| JP | 2010-268390 | 11/2010 |
| WO | 2008/149027 | 12/2008 |

OTHER PUBLICATIONS

Faruk et al., "Multi-Impairments Monitoring from the Equalizer in a Digital Coherent Optical Receiver", ECOC 2010, paper Th.10.A.1, Sep. 19-23, 2010, pp. 1-3.

Bosco et al., "Joint DGD, PDL and Chromatic Dispersion Estimation in Ultra-Long-Haul WDM Transmission Experiments with Coherent Receivers", ECOC 2010, paper Th.10.A.2, Sep. 19-23, 2010, pp. 1-3.

Extended European Search Report dated Sep. 18, 2013, in European Application No. 13172486.6-1860.

* cited by examiner

OPTICAL TRANSMISSION SYSTEM AND METHOD FOR MONITORING POLARIZATION DEPENDENT CHARACTERISTICS OF OPTICAL TRANSMISSION LINE

CROSS-REFERENCE TO RELATED APPLICATION

This application is based upon and claims the benefit of priority of the prior Japanese Patent Application No. 2012-166088, filed on Jul. 26, 2012, the entire contents of which are incorporated herein by reference.

FIELD

The embodiment discussed herein is related to an optical transmission system and a method for monitoring the polarization-dependent characteristic of an optical transmission line.

BACKGROUND

To achieve a long-distance and high-capacity transmission system, a technique for transmitting an optical signal by using digital signal processing has been studied and developed. Optical transmitters using digital signal processing can generate optical signals of a desired modulation format. For example, if an optical signal of a multi-value modulation format (quadrature phase shift keying (QPSK), 16 quadrature amplitude modulation (QAM) to 256QAM, or the like) is generated, the number of bits transmitted for each symbol increases. It is also possible to achieve multicarrier transmission (orthogonal frequency division multiplexing (OFDM), Nyquist WDM, or the like) by using digital signal processing. On the other hand, optical receivers can compensate the waveform distortion of received optical signals by using digital signal processing. A known example thereof is a method for compensating waveform distortion due to chromatic dispersion or the like by using digital signal processing.

A method for monitoring the state of an optical transmission line on the basis of the convergence state of a digital filter in the process of equalizing the waveform of a received signal by using digital signal processing is proposed. The proposed method monitors chromatic dispersion, differential group delay (DGD) between orthogonal polarizations due to polarization mode dispersion (PMD) and polarization dependent loss (PDL), or the like. (For example, Md. Saifuddin Faruk, et al., "Multi-Impairments Monitoring from the Equalizer in a Digital Coherent Optical Receiver", ECOC 2010, paper Th. 10. A. 1, 2010, and G. Bosco, et al., "Joint DGD, PDL and Chromatic Dispersion Estimation in Ultra-Long-Haul WDM Transmission Experiments with Coherent Receivers", ECOC 2010, paper Th. 10. A. 2, 2010).

In an optical transmission system, a method for estimating the state of an optical signal by using a known signal has been proposed as relate art. In an optical fiber communication system, a method for measuring polarization mode dispersion from coherent spectrum analysis has been proposed. Furthermore, a monitor circuit for calculating the quality of an optical signal on the basis of equalized electric field data obtained using a digital equalizing filter has been proposed. Furthermore, an optical amplifier repeated transmission system is proposed in which variations in the chromatic dispersion of an optical fiber transmission line due to temperature changes is suppressed. (Japanese Laid-open Patent Publication No. 2010-268390, No. 2004-138615, No. 2009-198364, and No. 8-274713)

Degradation in waveform due to PMD and/or PDL of an optical signal depends on the polarization state of the optical transmission line. However, the polarization state of the optical transmission line is not fixed and changes depending on various factors. For example, the polarization state of the optical transmission line changes depending on the temperature of the optical transmission line, a stress exerted on the optical fiber, and so on. Therefore, it is difficult to determine the worst condition concerning the polarization state of the optical transmission line.

On the other hand, to enhance the reliability of an optical transmission system, the optical transmission system is designed in consideration of the worst condition of the optical transmission line. However, it is difficult to determine the worst condition concerning the polarization state of the optical transmission line, as described above. Therefore, the optical transmission system is sometimes designed with an excess margin. This results in an increase in the number of optical repeaters on the optical transmission line.

Monitoring the polarization state of the optical transmission line over a long period of time allows the worst condition concerning the polarization state to be determined. If parameters for controlling the operation of the optical transmission system are determined on the basis of the thus-determined worst condition, high-quality communication can be achieved. However, it is not preferable that a long period of time be taken to construct the optical transmission system.

SUMMARY

According to an aspect of the embodiment, a method includes: sweeping an optical frequency of an optical signal by an optical transmitter controlling an electric-field information signal corresponding to a transmitted signal, providing different polarization states for individual frequencies of the optical signal by the optical transmitter controlling a mixture of a first electric-field information signal corresponding to a first transmitted signal and a second electric-field information signal corresponding to a second transmitted signal, obtaining, for individual frequencies of the optical signal, polarization dependent characteristics corresponding to different frequencies, when the optical transmitter sweeps the frequency of the optical signal, by an optical receiver calculating a polarization-dependent characteristic of an optical transmission line between the optical transmitter and the optical receiver, based on items of received-electric-field information corresponding to the different polarization states, and obtaining statistical information of a polarization state of the optical transmission line, based on the polarization dependent characteristics, with the optical receiver.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An object of the embodiment is to measure a characteristic of an optical transmission line in an optical transmission system, which depends on the polarization state of the optical transmission line, such as PMD and PDL, (in particular, the worst condition of the optical transmission line) in a short time.

Figure 1:
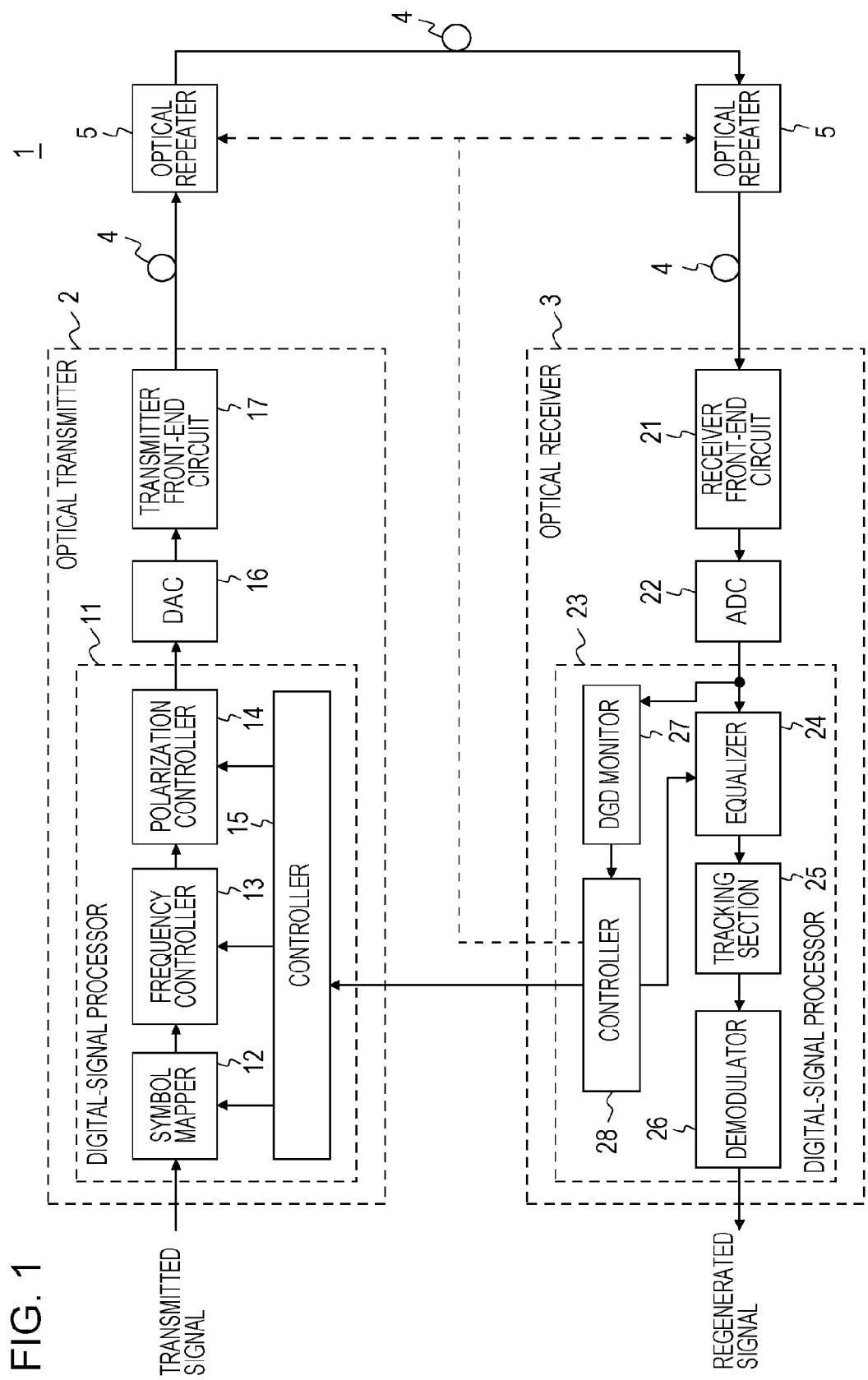
FIG. 1 is a diagram illustrating the configuration of an optical transmission system of an embodiment.

FIG. 1 illustrates the configuration of an optical transmission system 1 according to an embodiment. The optical transmission system 1 of this embodiment includes an optical transmitter 2 and an optical receiver 3. An optical signal generated by the optical transmitter 2 is transmitted to the optical receiver 3 through an optical transmission line 4. The optical transmission line 4 is constituted by an optical fiber cable. The optical transmission system 1 may have an optical repeater 5 between the optical transmitter 2 and the optical receiver 3. In this case, a plurality of optical repeaters 5 may be provided between the optical transmitter 2 and the optical receiver 3.

The optical transmitter 2 includes a digital-signal processor (DSP) 11, a digital-to-analog converter 16, and a transmitter front-end circuit 17. The configuration of the optical transmitter 2 is not limited to the configuration illustrated in FIG. 1; the optical transmitter 2 may have another circuit element.

The digital-signal processor 11 generates an electric-field information signal corresponding to a transmitted signal. The digital-signal processor 11 includes one or more processor that executes digital calculation and a memory. The digital-signal processor 11 may include a hardware circuit for processing the digital signal.

The digital-signal processor 11 includes a symbol mapper 12, a frequency controller 13, a polarization controller 14, and a controller 15. The functions of the symbol mapper 12, the frequency controller 13, the polarization controller 14, and the controller 15 may be achieved by, for example, large scale integration (LSI) circuit, or may be provided as a software program executed by one or more processor.

The symbol mapper 12 generates an electric-field information signal depending on a designated modulation format from the bit stream of the transmitted signal. For example, when the modulation system is the QPSK, an electric-field information signal representing one symbol is generated from 2-bit data. The frequency controller 13 controls the frequency of the optical signal by controlling the electric-field information signal. The polarization controller 14 controls the polarization state of the optical signal by controlling the electric-field information signal. The controller 15 controls the operations of the symbol mapper 12, the frequency controller 13, and the polarization controller 14.

The digital-to-analog converter 16 converts the electric-field information signal output from the digital-signal processor 11 to an analog signal. The transmitter front-end circuit 17 generates an optical signal from the electric-field information signal output from the digital-to-analog converter 16.

The optical receiver 3 includes a receiver front-end circuit 21, an analog-to-digital converter 22, and a digital-signal processor (DSP) 23. The configuration of the optical receiver 3 is not limited to the configuration illustrated in FIG. 1; the optical receiver 3 may have another circuit element.

The receiver front-end circuit 21 generates an electrical signal corresponding to the optical signal transmitted from the optical transmitter 2. This electrical signal indicates the electric-field information of the received optical signal. In other words, the receiver front-end circuit 21 generates an electric-field information signal including amplitude and phase information corresponding to the received optical signal. The analog-to-digital converter 22 converts the electrical signal output from the receiver front-end circuit 21 to a digital signal.

The digital-signal processor 23 processes the signal output from the analog-to-digital converter 22. In other words, the digital-signal processor 23 processes the digital signal indicating the electric-field information of the received optical signal. Here, the digital-signal processor 23 includes one or more processor that executes digital calculation, and a memory. The digital-signal processor 23 may also include a hardware circuit for processing the digital signal.

The digital-signal processor 23 includes an equalizer 24, a tracking section 25, a demodulator 26, a DGD monitor 27, and a controller 28. The functions of the equalizer 24, the tracking section 25, the demodulator 26, the DGD monitor 27, and the controller 28 may be achieved by, for example, an LSI circuit, or may be provided as a software program executed by one or more processor.

Although not particularly limited, the equalizer 24 shapes the waveform of the electrical signal generated by the receiver front-end circuit 21. The equalizer 24 is implemented by, for example, a digital filter. The equalizer 24 can shape a signal waveform so as to compensate (or suppress), for example, chromatic dispersion and polarization mode dispersion. The tracking section 25 tracks the carrier wave frequency and the optical phase of the received signal. The demodulator 26 demodulates the transmission data mapped to the electric-field information to regenerate the transmitted signal. The demodulator 26 executes demodulation corresponding to the modulation by the symbol mapper 12.

The DGD monitor 27 monitors the differential group delay (DGD) generated in the optical transmission line 4 on the basis of the signal output from the analog-to-digital converter 22 (that is, the digital signal indicating the electric-field information of the received optical signal). The DGD is an example of parameters indicating the polarization-dependent characteristic of the optical transmission line 4. Although a description is made below focusing on the DGD as a polarization-dependent characteristic, the PDL may be monitored as a polarization-dependent characteristic.

The controller 28 controls the operation of the equalizer 24 on the basis of the monitor result obtained by the DGD monitor 27. The controller 28 may also control the operation of the optical repeater 5 on the basis of the monitor result obtained by the DGD monitor 27. Furthermore, when the DGD monitor 27 is monitoring the DGD, the controller 28 provides an operation instruction to the controller 15 of the optical transmitter 2. Then, the controller 15 of the optical transmitter 2 controls the operations of the symbol mapper 12, the frequency controller 13, and the polarization controller 14 in accordance with the operation instruction.

The above-configured optical transmission system 1 measures the polarization-dependent characteristic of the optical transmission line 4, for example, before client data is transmitted from the optical transmitter 2 to the optical receiver 3. This measurement is executed by the DGD monitor 27. The communication parameters of the optical transmission system 1 are set or adjusted depending on the measurement result.

Figure 2:
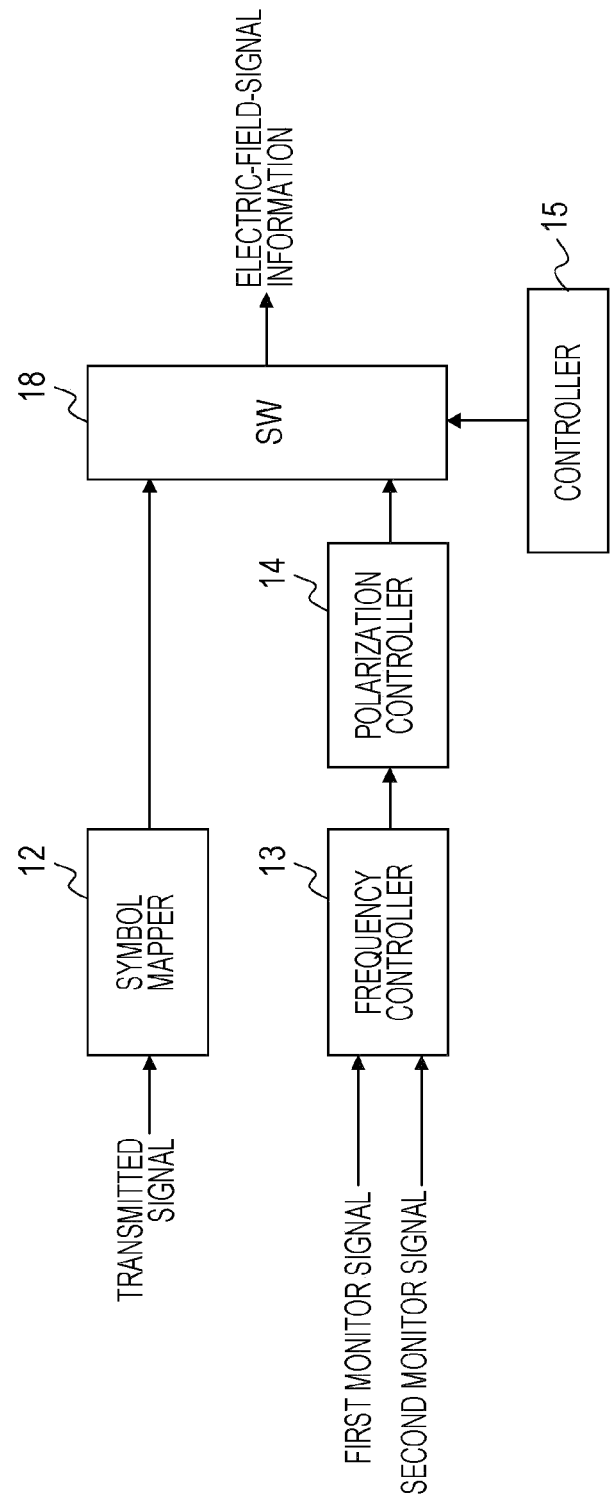
FIG. 2 is a diagram illustrating the operation of a digital-signal processor.

FIG. 2 is another diagram illustrating the operation of the digital-signal processor 11. In FIG. 2, the symbol mapper 12 generates an electric-field information signal from the bit stream of the transmitted signal depending on the designated modulation system. The transmitted signal may be input from, for example, a client.

The frequency controller 13 is given a first monitor signal and a second monitor signal. The first monitor signal and the second monitor signal are electric electric-field information signals that individually indicate electric-field information, which will be described later in detail. The first monitor signal and the second monitor signal are generated, for example, in the interior of the digital-signal processor 11. The frequency controller 13 can control the frequency of the optical signal that the optical transmitter 2 outputs by processing the first monitor signal and the second monitor signal. The polarization controller 14 can control the polarization of the optical signal that the optical transmitter 2 outputs by processing the output signal from the frequency controller 13.

The switch 18 selects one of the electric-field information signal output from the symbol mapper 12 and the output signal from the polarization controller 14 in accordance with the instruction of the controller 15. When the optical transmission system 1 transmits client data from the optical transmitter 2 to the optical receiver 3, the switch 18 selects the electric-field information signal output from the symbol mapper 12. When the optical transmission system 1 monitors the polarization state of the optical transmission line 4, the switch 18 selects the output signal from the polarization controller 14.

To implement the operation illustrated in FIG. 2 with the configuration in FIG. 1, the symbol mapper 12, the frequency controller 13, and the polarization controller 14 are controlled as follows. When the optical transmission system 1 monitors the polarization state of the optical transmission line 4, the symbol mapper 12 stops the modulation operation and outputs electric-field information signals corresponding to the first monitor signal and the second monitor signal. The frequency controller 13 controls the frequency of the optical signal by processing these electric-field information signals. The polarization controller 14 controls the polarization of the optical signal by processing the electric-field information signals output from the frequency controller 13. Accordingly, in this case, the digital-signal processor 11 outputs the electric-field information signals processed by the frequency controller 13 and the polarization controller 14.

On the other hand, when the optical transmission system 1 transmits client data, the symbol mapper 12 generates an electric-field information signal from the transmitted signal corresponding to the client data. At this time, the frequency controller 13 and the polarization controller 14 stop the operations. Accordingly, in this case, the digital-signal processor 11 generates an electric-field information signal corresponding to the transmitted signal and outputs the electric-field information signal.

Figure 3A:
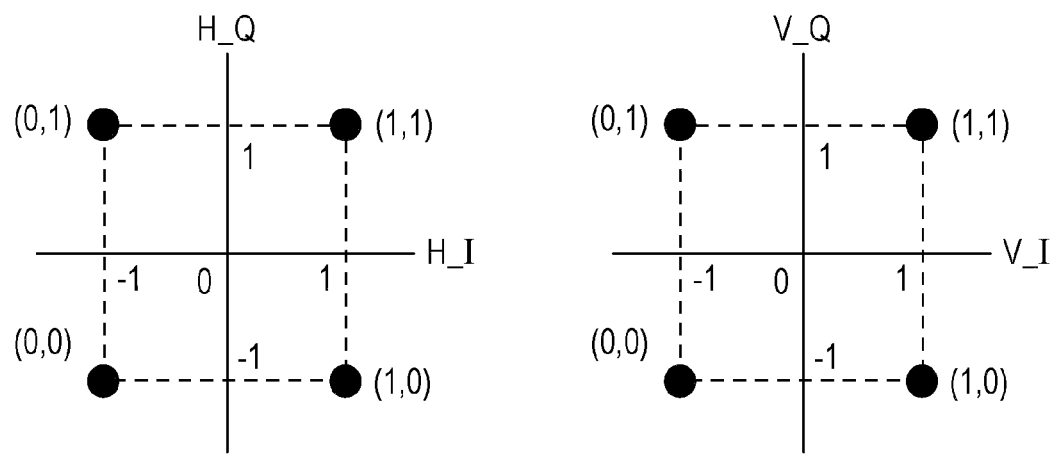
FIGS. 3A and 3B are diagrams illustrating the operation of the symbol mapper.
Figure 3B:
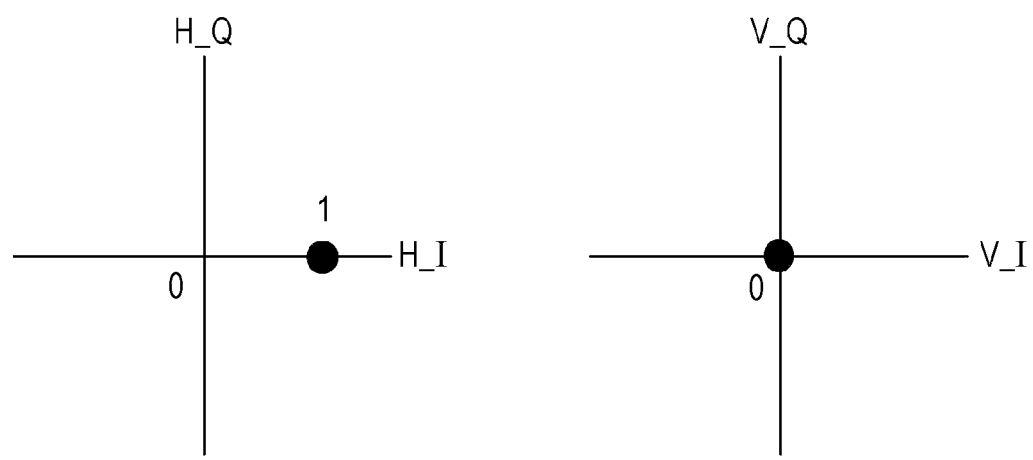

FIGS. 3A and 3B are diagrams illustrating the operation of the symbol mapper 12. Here, suppose that the optical transmitter 2 generates a polarization-multiplexed optical signal and transmits it. In this case, the symbol mapper 12 generates a set of electric-field information signals (an electric-field information signal H and an electric-field information signal V) from a set of transmitted signals (a transmitted signal H and a transmitted signal V). The transmitted signal H and the transmitted signal V are generated by arranging one transmitted signal in two parallel lines.

At data transmission, the symbol mapper 12 generates electric-field information values H_I and H_Q from the transmitted signal H and generates electric-field information values V_I and V_Q from the transmitted signal V, as illustrated in FIG. 3A. The values H_I and H_Q represent an I component (Real part) and a Q component (Imaginary part) of the electric-field information signal H, respectively. Similarly, the values V_I and V_Q represent an I component and a Q component of the electric-field information signal V, respectively. In the example illustrated in FIG. 3A, although the QPSK is designated as the modulation format, another modulation system (for example, multi-value quadrature amplitude modulation (M-QAM) or OFDM may be used.

In this case, the transmitted signal H is divided at intervals of two bits, and one symbol is generated from each 2-bit data. In this example, if the 2-bit data is "11", "H_I=1" and "H_Q=1" are output from the symbol mapper 12. Similarly, for "01", "H_I=−1" and "H_Q=1" are output; for "00", "H_I=−1" and "H_Q=−1" are output; and for "10", "H_I=1" and "H_Q=−1" are output.

Similarly, the transmitted signal V is also divided at intervals of two bits, and one symbol is generated from each 2-bit data. In this example, if the 2-bit data is "11", "V_I=1" and "V_Q=1" are output from the symbol mapper 12. Similarly, for "01", "V_I=−1" and "V_Q=1" are output; for "00", "V_I=−1" and "V_Q=−1" are output; and for "10", "V_I=1" and "V_Q=−1" are output.

The optical transmitter 2 does not have to use polarization multiplexing. When the optical transmitter 2 transmits a single polarized optical signal, the symbol mapper 12 generates the electric-field information values H_I and H_Q from the transmitted signal. In this case, "0" is output as the electric-field information values V_I and V_Q.

When the monitor is in operation, the symbol mapper 12 outputs an electric-field information signal corresponding to a signal in which the values of symbols are fixed. For example, the symbol mapper 12 outputs "H_I=1", "H_Q=0", "V_I=0", and "V_Q=0", as illustrated in FIG. 3B.

Figure 4:
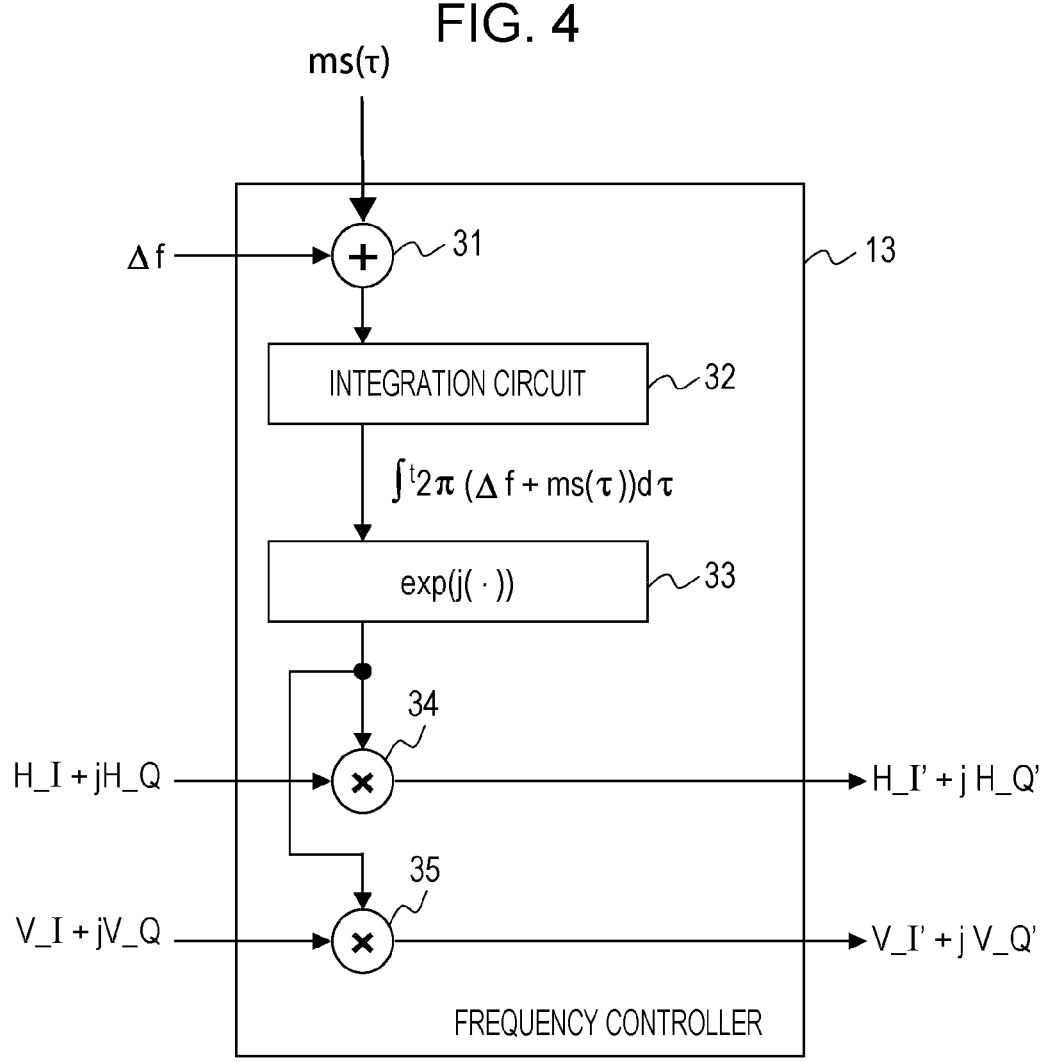
FIG. 4 is a diagram illustrating the configuration and the operation of a frequency controller.

FIG. 4 is a diagram illustrating the configuration and the operation of the frequency controller 13. The frequency controller 13 is an IQ rotator including an adder 31, an integration circuit 32, a converter 33, and multipliers 34 and 35. The frequency controller 13 is given a frequency adjustment amount $\Delta f$. The frequency adjustment amount $\Delta f$ corresponds to the variable amount of the frequency (carrier wave frequency) of the optical signal. The carrier wave frequency of the optical signal shifts in response to the frequency adjustment amount $\Delta f$. Although the frequency adjustment amount $\Delta f$ is not particularly limited, values corresponding to, for example, 100 MHz to several GHz, are used.

Furthermore, the frequency controller 13 receives the electric-field information signal H (H_I+jH_Q) and the electric-field information signal V (V_I+jV_Q). The values H_I, H_Q, V_I, and V_Q are electric-field information values output from the symbol mapper 13. The value "j" indicates a complex number.

The adder 31 adds between the frequency adjustment amount Δf, and a dithering signal ms (τ) provided from the frequency controller 13. The integration circuit 32 integrates the output value of the adder 31. The converter 33 converts the output value from the integration circuit 32 into an exponential form. The multiplier 34 obtains an electric-field information signal H' (H_I'+jH_Q') by multiplying the electric-field information signal H (H_I+jH_Q) by the output value from the converter 33. Similarly, the multiplier 35 obtains an electric-field information signal V' (V_I'+jV_Q') by multiplying the electric-field information signal V (V_I+jV_Q) by the output value from the converter 33.

In the above frequency controller 13, as the value Δf increases, the frequencies of the optical signals generated from the electric-field information signals H' and V' increase gradually. In other words, by varying the value Δf, sweeping of the frequency of the optical signal is implemented. The configuration illustrated in FIG. 4 is merely an example, and the frequency controller 13 may be implemented using another configuration.

Figure 5:
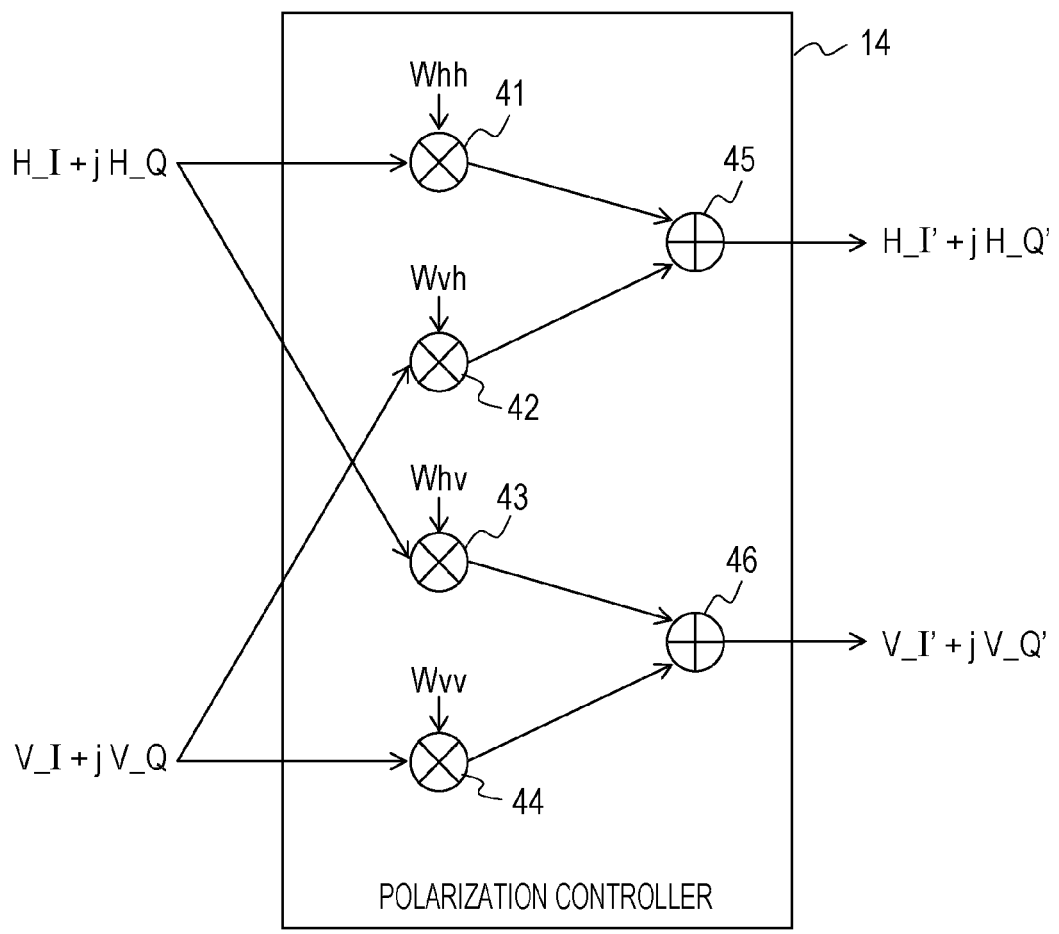
FIG. 5 is a diagram illustrating the configuration and the operation of a polarization controller.

FIG. 5 is a diagram illustrating the configuration and the operation of the polarization controller 14. The polarization controller 14 includes multipliers 41 to 44 and adders 45 and 46. Electric-field information signals output from the frequency controller 13 illustrated in FIG. 4 are given to the polarization controller 14. The electric-field information signals "H_I+jH_Q" and "V_I+jV_Q" input to the polarization controller 14 correspond to the electric-field information signals "H_I'+jH_Q'" and "V_I'+jV_Q'" output from the frequency controller 13 illustrated in FIG. 4.

The multiplier 41 multiplies the value H_I+jH_Q by a tap coefficient Whh. The multiplier 42 multiplies the value V_I+jV_Q by a tap coefficient Wvh. The adder 45 adds up the output values from the multipliers 41 and 42 to generate an electric-field information signal H_I'+jH_Q'.

Similarly, the multiplier 43 multiplies the value H_I+jH_Q by a tap coefficient Whv. The multiplier 44 multiplies the value V_I+jV_Q by a tap coefficient Wvv. The adder 46 adds up the output values from the multipliers 43 and 44 to generate an electric-field information signal V_I'+jV_Q'.

The calculation performed by the polarization controller 14 is expressed by Eq. (1).

$$\begin{bmatrix} H\_I' + jH\_Q' \\ V\_I' + jV\_Q' \end{bmatrix} = \begin{bmatrix} Whh & Wvh \\ Whv & Wvv \end{bmatrix} \begin{bmatrix} H\_I + jH\_Q \\ V\_I + jV\_Q \end{bmatrix} \quad (1)$$

Here, a tap coefficient matrix W is expressed by Eq. (2).

$$\begin{bmatrix} Whh & Wvh \\ Whv & Wvv \end{bmatrix} = \begin{bmatrix} \exp\left(j\frac{\phi}{2} * \frac{\pi}{180}\right) & 0 \\ 0 & \exp\left(-j\frac{\phi}{2} * \frac{\pi}{180}\right) \end{bmatrix} \quad (2)$$

$$\begin{bmatrix} \cos\left(\theta * \frac{\pi}{180}\right) & -\sin\left(\theta * \frac{\pi}{180}\right) \\ \sin\left(\theta * \frac{\pi}{180}\right) & \cos\left(\theta * \frac{\pi}{180}\right) \end{bmatrix}$$

The individual tap coefficients are determined by parameters ϕ, θ, as expressed in Eq. (2). The parameter ϕ controls the phase difference between the polarizations of the electric-field information signals. The parameter θ controls the mixing ratio of the electric-field information signals of the two orthogonal polarizations.

Here, the influence of ϕ is ignored for ease of explanation (for example, ϕ=0). Then, if θ=0 is given, the tap coefficients Whh, Wvh, Whv, and Wvv are 1, 0, 0, and 1, respectively. In this case, the polarization controller 14 outputs the following calculation result: H_I'+jH_Q'=+jH_QV_I'+jV_Q'=V_I+jV_Q.

If θ=90° is given, the tap coefficients Whh, Wvh, Whv, and Wvv are 0, −1, 1, and 0, respectively. In this case, the polarization controller 14 outputs the following calculation result: H_I'+jH_Q'=−V_I−jV_QV_I'+jV_Q'=+jH_Q.

If θ=45° is given, the tap coefficients Whh, Wvh, Whv, and Wvv are √2/2, −√2/2, √2/2, √2/2, respectively. In this case, the polarization controller 14 outputs the following calculation result: H_I'+jH_Q'=√2/2(H_I+jH_Q)−√2/2(V_I+jV_Q) V_I'+jV_Q'=√2/2(H_I+jH_Q)+√2/2(V_I+jV_Q).

The digital-signal processor 11 outputs H_I', H_Q', V_I', and V_Q' for each symbol. When the monitor is in operation, the values H_I', H_Q', V_I', and V_Q' indicate the symbol signals illustrated in FIG. 3B, which are processed by, for example, the frequency controller 13 and the polarization controller 14. At data transmission, the values H_I', H_Q', V_I', and V_Q' indicate, for example, the symbol signals illustrated in FIG. 3A.

Figure 6:
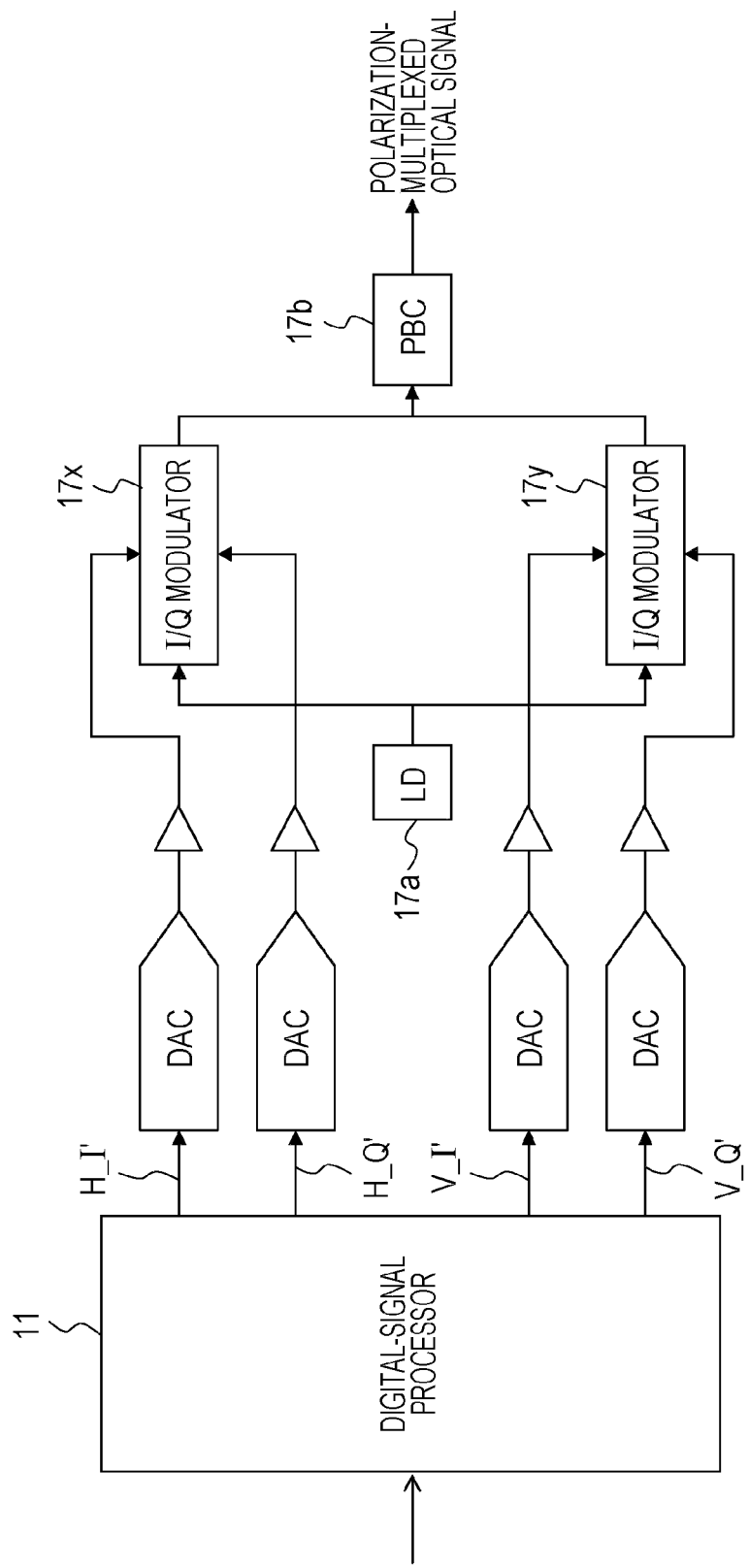
FIG. 6 is a diagram illustrating an example of a transmitter front-end circuit.

FIG. 6 illustrates an example of the transmitter front-end circuit 17. As described with reference to FIGS. 3A and 3B to FIG. 5, the digital-signal processor 11 outputs the signals H_I', H_Q', V_I', and V_Q'. The signals XI', XQ', YI', and YQ' are each converted to an analog signal by the digital-to-analog converter 16 and are given to the transmitter front-end circuit 17.

The transmitter front-end circuit 17 includes a light source (LD) 17a, I/Q (in-phase/quadrature) modulators 17x and 17y, and a polarization beam combiner (PBC) 17b. An example of the light source 17a is a laser diode, which outputs continuous light. The continuous light is split and guided to the I/Q modulators 17x and 17y.

The I/Q modulator 17x is given the signals H_I' and H_Q'. Then, the I/Q modulator 17x modulates the continuous light with the signals H_I' and H_Q' to generate an X-polarized optical signal. Similarly, the I/Q modulator 17y is given the signals V_I' and V_Q'. Then, the I/Q modulator 17y modulates the continuous light with the signals V_I' and V_Q' to generate a Y-polarized optical signal. In this way, the signals H_I' and H_Q' are used as driving signals for the I/Q modulator 17x. The signals V_I' and V_Q' are used as driving signals for the I/Q modulator 17y. As illustrated in FIG. 6, the transmitter front-end circuit 17 may include amplifiers for amplifying the signals H_I', H_Q', V_I', and V_Q', respectively.

The polarization beam combiner 17b multiplexes the polarization of the X-polarized optical signal generated by the I/Q modulator 17x and the Y-polarized optical signal generated by the I/Q modulator 17y. Thus, a polarization-multiplexed optical signal is generated. The polarization-multiplexed optical signal is transmitted via the optical transmission line 4 illustrated in FIG. 1 and is received by the optical receiver 3.

Figure 7:
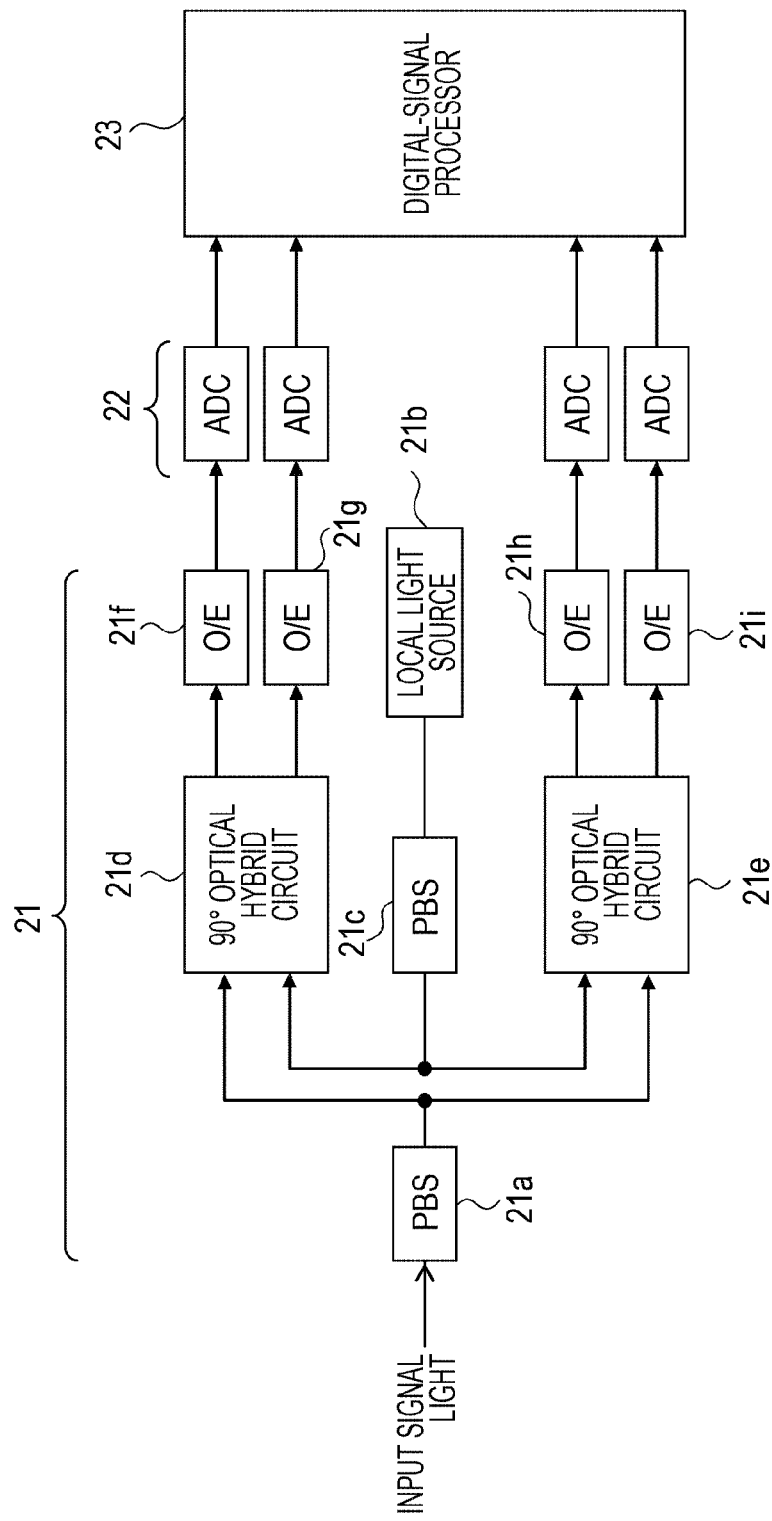
FIG. 7 is a diagram illustrating an example of a receiver front-end circuit.

FIG. 7 illustrates an example of the receiver front-end circuit 21. The receiver front-end circuit 21 is a coherent receiver, which receives the optical signal generated by the optical transmitter 2. The receiver front-end circuit 21 includes a polarization beam splitter 21a, a local light source 21b, a polarization beam splitter 21c, 90° optical hybrid circuits 21d and 21e, and optical-to-electrical converters 21f to 21i.

The polarization beam splitter 21a splits the received optical signal into a set of orthogonal polarization components. Hereinafter, one polarization component obtained by the polarization beam splitter 21a is referred to as a first polarized optical signal, and the other is referred to as a second polarized optical signal. The first polarized optical signal is guided to the 90° optical hybrid circuit 21d, and the second polarized optical signal is guided to the 90° optical hybrid circuit 21e.

An example of the local light source 21b is a laser diode, which generates local light. The local light is continuous light. The frequencies of light emitted from the light source 17a and the local light source 21b are the same or substantially the same. The polarization beam splitter 21c splits the local light generated by the local light source 21b into orthogonal polarization components. One of the polarization components of the local light is guided to the 90° optical hybrid circuit 21d, and the other is guided to the 90° optical hybrid circuit 21e.

The 90° optical hybrid circuit 21d outputs I-component light and Q-component light corresponding to the first polarized optical signal by using the local light given from the polarization beam splitter 21c and its 90°-shifted local light. The optical-to-electrical converters 21f and 21g convert the I-component light and the Q-component light output from the 90° optical hybrid circuit 21d to electrical signals, respectively. Accordingly, the one set of electrical signals obtained by the optical-to-electrical converters 21f and 21g indicates the electric-field information of the first polarized optical signal.

Similarly, the 90° optical hybrid circuit 21e outputs I-component light and Q-component light corresponding to the second polarized optical signal by using the local light given from the polarization beam splitter 21c and its 90°-shifted local light. The optical-to-electrical converters 21h and 21i convert the I-component light and the Q-component light output from the 90° optical hybrid circuit 21e to electrical signals, respectively. Accordingly, the one set of electrical signals obtained by the optical-to-electrical converters 21h and 21i indicate the electric-field information of the second polarized optical signal.

In this way, the receiver front-end circuit 21 outputs the four electrical signals (the signals indicating the electric-field information of the first polarized optical signal and the signal indicating the electric-field information of the second polarized optical signal). These signals are each converted to a digital signal by the analog-to-digital converter 22 and are given to the digital-signal processor 23.

Figure 8:
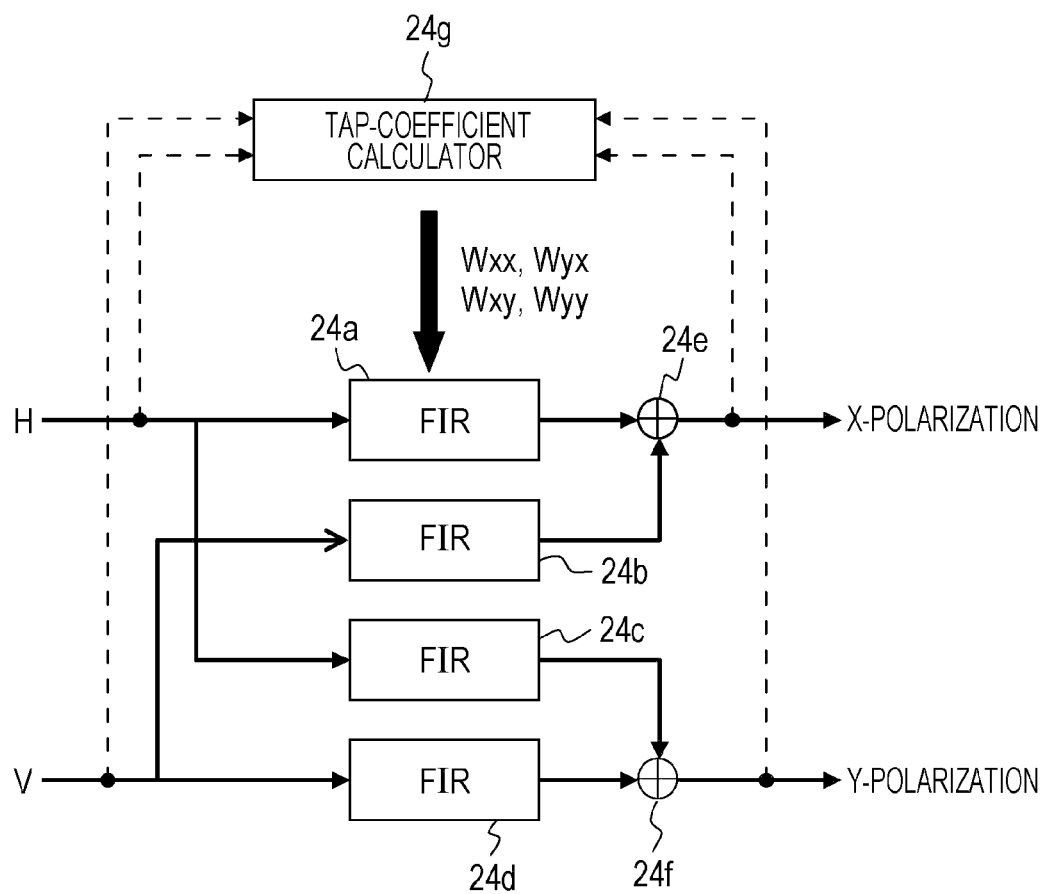
FIG. 8 is a diagram illustrating an example of an equalizer.

FIG. 8 illustrates an example of the equalizer 24. As illustrated in FIG. 8, the equalizer 24 includes FIR filters 24a to 24d, adders 24e and 24f, and a tap-coefficient calculator 24g. The equalizer 24 receives an H-polarization signal and a V-polarization signal as input. The H-polarization signal indicates the I component and the Q component of one polarized optical signal. The V-polarization signal indicates the I component and the Q component of the other polarized optical signal. The H-polarization signal and the V-polarization signal indicate the electric-field information of the output optical signals from the 90° optical hybrid circuits 21d and 21e illustrated in FIG. 7, respectively.

The FIR filter 24a processes the H-polarization signal by using a tap-coefficient vector Wxx. The FIR filter 24b processes the V-polarization signal by using a tap-coefficient vector Wyx. The FIR filter 24c processes the H-polarization signal by using a tap-coefficient vector Wxy. The FIR filter 24d processes the V-polarization signal by using a tap-coefficient vector Wyy.

The FIR filters 24a to 24d each have an N−1 stage shift register. The tap-coefficient vectors Wxx, Wyx, Wxy, and Wyy each have N elements. N is an integer equal to or larger than 2. The FIR filters 24a to 24d each multiply continuous N input symbols by corresponding one of the tap-coefficient vectors Wxx, Wyx, Wxy, and Wyy. In other words, the FIR filters 24a to 24d multiply the individual symbols of the input signals by corresponding one of the tap coefficients Whh, Wvh, Whv, and Wvv. The FIR filters 24a to 24d each output the sum of N products obtained by the multiplication. Since the FIR filters 24a to 24d can be implemented by known art, a detailed description thereof will be omitted.

The adder 24e adds up the output signals from the FIR filters 24a and 24b to generate an X-polarization signal. The adder 24f adds up the output signals from the FIR filters 24c and 24d to generate a Y-polarization signal.

The tap-coefficient calculator 24g calculates the individual tap coefficients Whh, Wvh, Whv, and Ww on the basis of the input signals to the equalizer 24 and the output signals from the equalizer 24. In other words, the tap-coefficient calculator 24g calculates the tap-coefficient vectors Wxx, Wyx, Wxy, and Wyy on the basis of the input signals (the H-polarization signal and the V-polarization signal) and the output signals (the X-polarization signal and the Y-polarization signal). The individual tap coefficients Whh, Wvh, Whv, and Wvv are calculated using, for example, the constant modulus algorithm (CMA).

The equalizer 24 can equalize the waveform, which is degraded via the optical transmission line 4, by appropriately setting the tap-coefficient vectors Wxx, Wyx, Wxy, and Wyy. For example, the equalizer 24 can shape the waveform of the received signal so as to compensate or suppress polarization mode dispersion. Alternatively, the equalizer 24 may shape the waveform of the received signal so as to compensate or suppress chromatic dispersion.

The tracking section 25 tracks the carrier wave frequency and the optical phase of the output signal from the equalizer 24. In other words, the tracking section 25 compensates the frequency offset (the difference between the frequency of light from the light source 17a and the frequency of light from the local light source 21b). The tracking section 25 also compensates the phase difference between the frequency of light from the light source 17a and the frequency of light from the local light source 21b. The demodulator 26 demodulates the output signal from the tracking section 25 to thereby regenerate the transmitted signal. The demodulator 26 executes demodulation corresponding to the modulation performed by the symbol mapper 12.

The DGD monitor 27 calculates the differential group delay $\Delta\tau$ (that is, DGD) of the optical transmission line 4 on the basis of the electric-field information signal corresponding to the received optical signal. In other words, the DGD monitor 27 calculates the differential group delay $\Delta\tau$ of the optical transmission line 4 on the basis of the electric-field information of the first and second polarization signals obtained by the receiver front-end circuit 21.

When the DGD monitor 27 calculates the differential group delay $\Delta\tau$ of the optical transmission line 4, the frequency controller 13 sets the frequency of the optical signal to $\omega_1$, and the polarization controller 14 sets the value $\theta$ in Eq. (2) to 0°, 45°, 90° in order. In this description, the frequency and the angular frequency are referred to as a frequency without making distinction. The DGD monitor 27 obtains received-electric-field information $(x_1, y_1)$ for $\theta=0$, receivedelectric-field information ($x_2$, $y_2$) for θ=45, and received-electric-field information ($x_3$, $y_3$) for θ=90. The values $x_1$, $x_2$, and $x_3$ are complex numbers that stand for the electric field of one of a set of orthogonal polarization components. The values $y_1$, $y_2$, and $y_3$ are complex numbers that stand for the other polarization component of the set of orthogonal polarization components.

The DGD monitor 27 calculates the following Jones matrix T from the three sets of received-electric-field information, ($x_1$, $y_1$), ($x_2$, $y_2$), and ($x_3$, $y_3$), where β is a propagation constant.

$$T = \beta \begin{bmatrix} k_1 k_4 & k_2 \\ k_4 & 1 \end{bmatrix}$$

$$k_1 = \frac{x_1}{y_1}, k_2 = \frac{x_2}{y_2}, k_3 = \frac{x_3}{y_3}, k_4 = \frac{k_3 - x_3}{k_1 - x_1}$$

Next, the frequency controller 13 sets the frequency of the optical signal to $\omega_2$. The DGD monitor 27 obtains the received-electric-field information ($x_1$, $y_1$), ($x_2$, $y_2$), and ($x_3$, $y_3$) for the frequency $\omega_2$ and calculates the Jones matrix T by using the above method.

In this way, the DGD monitor 27 calculates the Jones matrix T ($\omega_1$) for the frequency $\omega_1$ and calculates the Jones matrix T ($\omega_2$) for the frequency $\omega_2$. Furthermore, the DGD monitor 27 obtains eigenvalues $\rho_1$ and $\rho_2$ of $T(\omega_1)T^{-1}(\omega_2)$. Thus, the differential group delay Δτ of the optical transmission line 4 is obtained by the following Eq. (4):

$$\Delta\tau = |\tau_1 - \tau_2| = \frac{\text{Arg}(\rho_1 - \rho_2)}{\Delta\omega} \quad (3)$$

In the above example, although the DGD is calculated by the Jones matrix eigenanalysis, the embodiment is not limited thereto. For example, the DGD monitor 27 may calculate the DGD by using the Muller matrix method using a Stokes vector. An example of the calculation of the DGD is described in R. M. Jopson, L. E. Nelson, and H. Kogelnik, "Measurement of Second-Order Polarization-Mode Dispersion Vectors in Optical Fibers," IEEE Photon. Technol. Lett. 11(9), 1153-1155 (1999).

In this way, the DGD monitor 27 can calculate the DGD of the optical transmission line 4 by using the received-electric-field information. However, the polarization state of the optical transmission line 4 is not fixed and changes depending on various factors. For example, the polarization state of the optical transmission line 4 changes depending on the temperature of the optical transmission line 4, a stress exerted on the optical fiber, and so on. Accordingly, it is difficult to determine the worst condition concerning the polarization state of the optical transmission line 4 from a DGD measured at a certain time. Thus, the optical transmitter 2 and the optical receiver 3 have a function for providing changes in the polarization state of the optical transmission line 4 in a pseudo manner.

Figure 9:
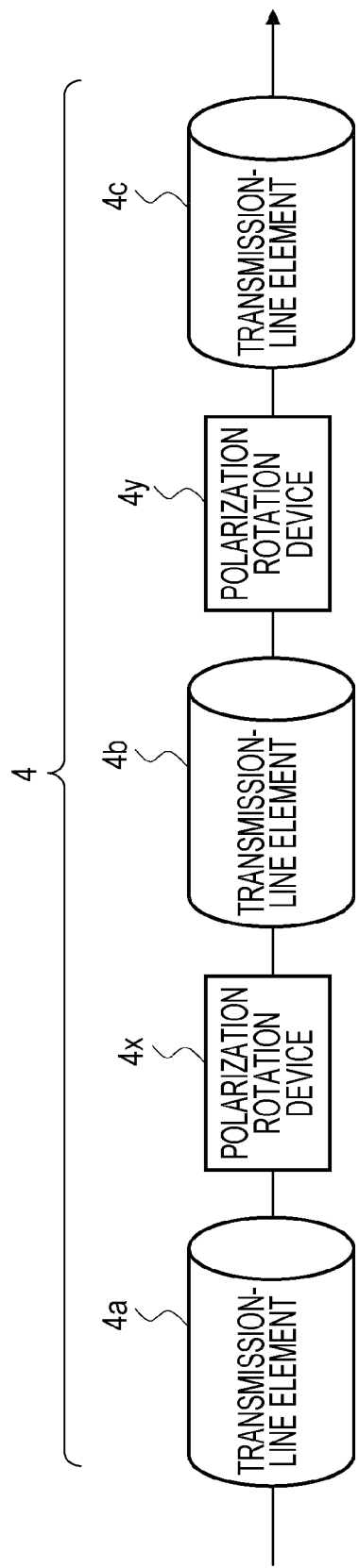
FIG. 9 is a diagram illustrating modeling of an optical transmission line.

As illustrated in FIG. 9, the optical transmission line 4 can be modeled using a plurality of transmission-line elements (fibers) 4a, 4b, 4c, . . . and a plurality of polarization rotation devices 4x, 4y, . . . . The plurality of transmission-line elements have unique DGDs. In this case, the total amount of DGDs of the optical transmission line 4 changes depending on the joined state of the transmission-line elements (that is, the states of the polarization rotators). Here, the state of the polarization rotators changes owing to the temperature, vibration, stress, and so on.

On the other hand, in the case where the optical transmission line 4 has a DGD™, the electric field output from the optical transmission line 4 is expressed by the following expression: Ex'=Ex exp(jωτ/2)Ey'=Ey exp(−jωτ/2). In other words, the polarization state output from the optical transmission line 4 depends on the frequency ω of the optical signal and the DGDτ. Accordingly, changing the frequency ω allows changes in the joined state of the transmission-line elements (the phase difference between polarizations provided by the polarization rotators) to be realized even if the joined state of the transmission-line elements (the states of the polarization rotators) is not changed.

Thus, changing the frequency ω of the optical signal is equivalent to changing the polarization state of the optical transmission line 4. In other words, when the DGDs of the individual frequencies are measured while the frequency ω of the optical signal is being swept, the polarization state of the optical transmission line 4, which changes owing to various factors, can be substantially measured. Accordingly, the optical transmitter 2 and the optical receiver 3 can estimate the worst case and the variation range of the polarization state of the optical transmission line 4 without monitoring the polarization state of the optical transmission line 4 over a long period of time.

Figure 10:
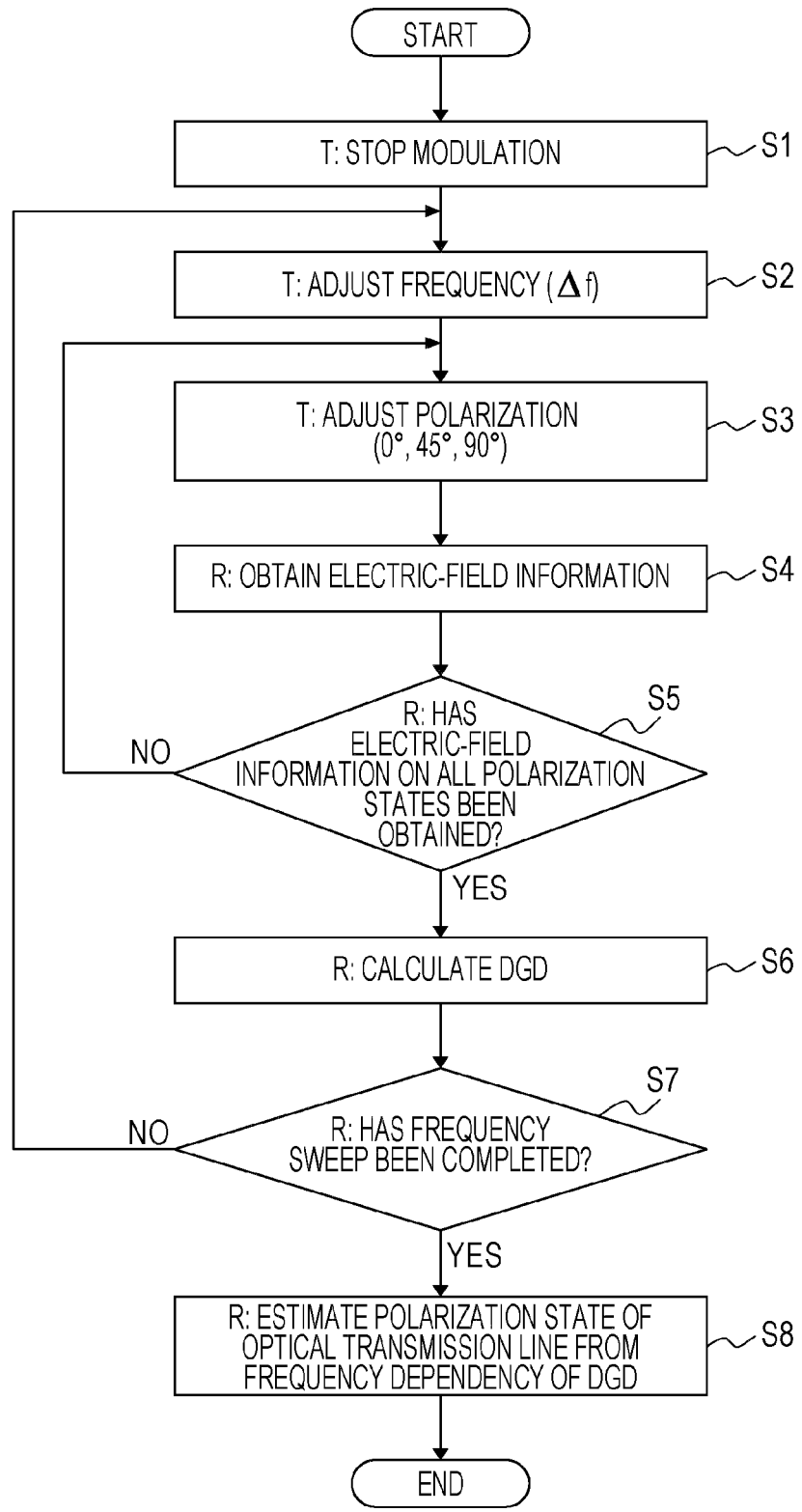
FIG. 10 is a flowchart illustrating a process for estimating the polarization state of the optical transmission line.

FIG. 10 is a flowchart illustrating a process for estimating the polarization state of the optical transmission line 4. Although not particularly limited, the process in the flowchart is executed, for example, before the operation of the optical transmission system 1 is started. In FIG. 10, reference sign T denotes a process executed by the optical transmitter 2, and R denotes a process executed by the optical receiver 3. The controller 15 of the optical transmitter 2 and the controller 28 of the optical receiver 3 can send a control signal to each other.

In S1, the optical transmitter 2 stops a modulation operation. In other words, the digital-signal processor 11 generates the signal illustrated in FIG. 3B and gives it to the frequency controller 13. From then on, the optical transmitter 2 transmits optical signals in which the values of symbols are fixed.

In S2, the frequency controller 13 adjusts the frequency of the optical signal. However, at the start of the flowchart, the frequency controller 13 sets the frequency of the optical signal to a predetermined initial value. The initial value of the frequency is not particularly limited; for example, the initial value is set by giving "1" from the converter 33 to the multipliers 34 and 35 in FIG. 4. In this case, the frequency of the optical signal output from the optical transmitter 2 is substantially the same as the frequency of light emitted from the light source 17a.

In S3, the polarization controller 14 controls the polarization of the optical signal. At this time, the polarization controller 14 gives predetermined θ (0°, 45°, or 90°) to the above Eq. (2). Thus, an optical signal in a polarization state corresponding to the given θ is generated.

In S4, the DGD monitor 27 acquires the electric-field information of the received optical signal. The electric-field information that the DGD monitor 27 has acquired is stored in a storage area that the DGD monitor 27 can access.

In S5, the DGD monitor 27 determines whether electric-field information on all the polarization states (θ=0, 45, 90) has been acquired. If electric-field information on all the polarization states (θ=0, 45, 90) has not been acquired, the controller 28 requests the optical transmitter 2 to change the polarization state. In this case, the process in the flowchart moves to S3. If electric-field information on all the polarization states has been acquired, the process in the flowchart moves to S6. In this way, the optical transmitter 2 and the optical receiver 3 individually acquire received-electric-field information for θ=0°, 45°, 90°, in S3 to S5.

In S6, the DGD monitor 27 calculates a DGD on the basis of the received-electric-field information acquired in S3 to S5. Although not particularly limited, the DGD is calculated by the Jones matrix method described above. The calculated DGD is stored in a storage area that the DGD monitor 27 can access.

In S7, the DGD monitor 27 determines whether sweeping of the frequency of the optical signal has been completed. At this time, the DGD monitor 27 checks if the DGD values of all the frequencies in the designated frequency sweep range have been completed. The frequency sweep range may be determined, for example, depending on the operating environment of the optical transmission system 1. The operating environment conditions include, for example, the temperature range (for example, −10 to 50° C.) of the environment in which the optical transmission system 1 is used. In this case, if the assumed temperature range is wide, the frequency sweep range is also wide.

If the frequency sweeping has not been completed, the controller 28 requests the optical transmitter 2 to shift the frequency of the optical signal. In this case, the process in the flowchart moves to S2. Then, the frequency controller 13 changes the frequency adjustment amount Δf in S2 to thereby shift the frequency of the optical signal. Although not particularly limited, examples of the value of Δf are 100 MHz to several GHz. The DGD monitor 27 calculates the DGD for the changed frequency.

In this way, the optical transmitter 2 and the optical receiver 3 repeatedly execute the process from S2 to S6 until the sweeping of the frequency of the optical signal is completed. In other words, the DGD monitor 27 calculates DGD values for all the frequencies in the designated frequency sweep range. As a result, the DGD values of the plurality of different frequencies can be obtained.

Figure 11:
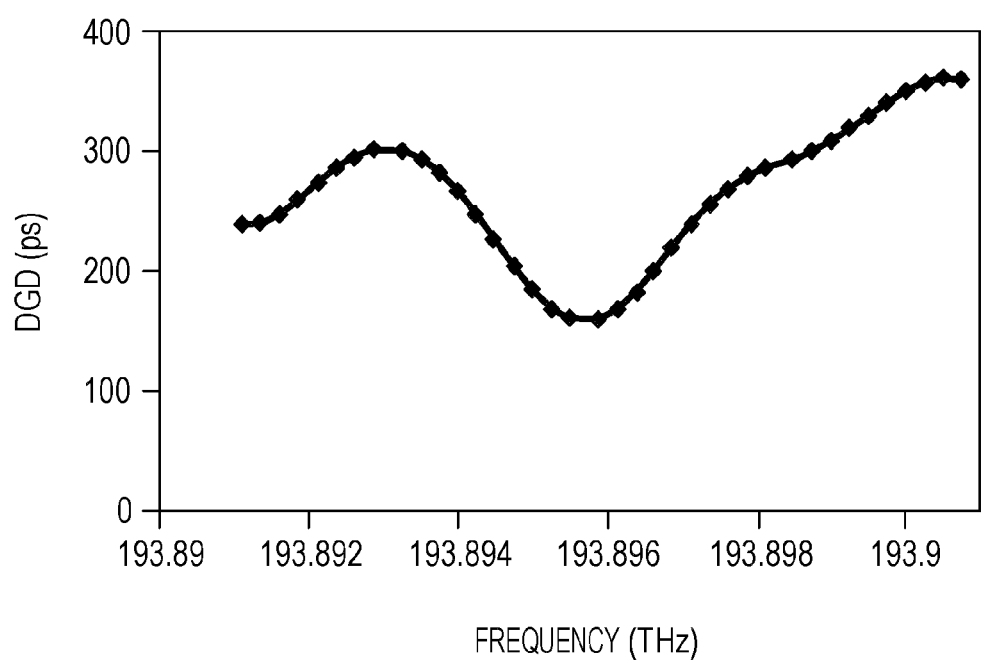
FIG. 11 is a diagram illustrating an example of the distribution of DGD values obtained by a DGD monitor.

FIG. 11 illustrates an example of the distribution of DGD values obtained by the DGD monitor 27. In this example, the sweep range of the frequency of the optical signal is about 10 GHz. The frequency adjustment amount Δf of the frequency sweep is about 250 MHz. In other words, the DGD values are calculated at an interval of about 250 MHz. In the example illustrated in FIG. 11, the maximum DGD=362 ps, an average DGD=265 ps, and the minimum DGD=161 ps are obtained.

If the frequency sweeping has been completed (S7: Yes), the process in the flowchart moves to S8. In S8, the DGD monitor 27 estimates the polarization state of the optical transmission line 4 on the basis of the frequency dependency of the DGDs obtained as descried above. Alternatively, the DGD monitor 27 estimates the worst condition of the DGD of the optical transmission line 4 on the basis of the distribution of the plurality of DGD values obtained as described above.

Here, it is known that the distribution of the plurality of DGD values obtained as described above substantially follows the Maxwell distribution. In the Maxwell distribution, the horizontal axis indicates the DGD value, and the vertical axis indicates the frequency of detection or the probability of occurrence of a DGD value. Thus, giving the mean value of the DGD values to this Maxwell distribution (in the example illustrated in FIG. 11, 265 ps) allows, for example, a DGD value such that the probability of occurrence decreases to a predetermined value (for example, $10^{-5}$) to be calculated. In this case, the DGD monitor 27 can output the thus-calculated DGD value as "the maximum DGD of the optical transmission line 4" or "the worst DGD of the optical transmission line 4". The DGD monitor 27 can also obtain the range of changes of the DGD of the optical transmission line 4 by using this Maxwell distribution.

Alternatively, the DGD monitor 27 may determine the maximum DGD without using the Maxwell distribution. For example, the DGD monitor 27 may output, as "the maximum DGD", the maximum DGD value measured in the example illustrated in FIG. 11 during the frequency sweeping.

In this way, the optical transmitter 2 and the optical receiver 3 individually measure DGDs for the plurality of frequencies while sweeping the frequency of the optical signal and estimate the polarization state of the optical transmission line 4 on the basis of the plurality of DGD values obtained by the measurement. Here, the sweeping of the frequency of the optical signal is equivalent to changing the polarization state of the optical transmission line 4. Accordingly, the optical transmitter 2 and the optical receiver 3 can estimate the worst case and the change range of the polarization state of the optical transmission line 4 without monitoring the polarization state of the optical transmission line 4 over a long period of time.

Figure 12:
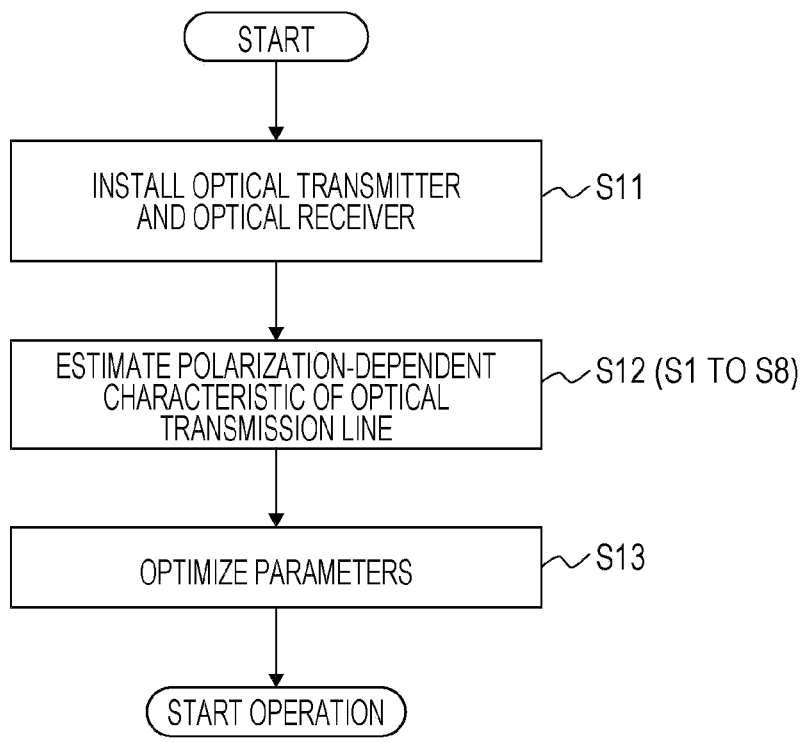
FIG. 12 is a flowchart illustrating a process for setting the parameters of the communication equipment of the optical transmission system.

FIG. 12 is a flowchart illustrating a process for setting the parameters of the communication equipment of the optical transmission system 1. Although not particularly limited, the process in the flowchart is executed, for example, before the operation of the optical transmission system 1 is started, or alternatively, the process in the flowchart may be executed when the optical transmission system 1 is restarted.

In S11, the optical transmitter 2 and the optical receiver 3 are installed in the optical transmission system 1. In other words, the optical transmitter 2 and the optical receiver 3 are connected to the optical transmission line 4 and are supplied with power.

In S12, the optical transmitter 2 and the optical receiver 3 estimate the polarization-dependent characteristic of the optical transmission line 4. The process in S12 is implemented in S1 to S8 of FIG. 10. Accordingly, the optical transmission system 1 can specify, for example, "the maximum DGD of the optical transmission line 4".

In S13, parameters responsible for the operation of the communication equipment of the optical transmission system 1 are optimized on the basis of the polarization-dependent characteristic of the optical transmission line 4. Examples of the communication equipment for which the parameters are optimized include the optical transmitter 2, the optical receiver 3, and the optical repeater 5.

A wavelength multiplexed transmission system that uses a plurality of wavelengths can obtain the statistical distribution of DGDs in a plurality of wavelength bands by using a plurality of transmitters and receivers. It is also possible to improve the accuracy of measurement by combining the distribution obtained from the plurality of transmitters and receivers. With the above configuration, although frequency control is performed only by frequency control using digital signal processing, it is also possible to vary the frequency in a wider range by combining control of the frequencies of light from the transmitter light source and the receiver light source and frequency control using digital signal processing.

Figure 13:
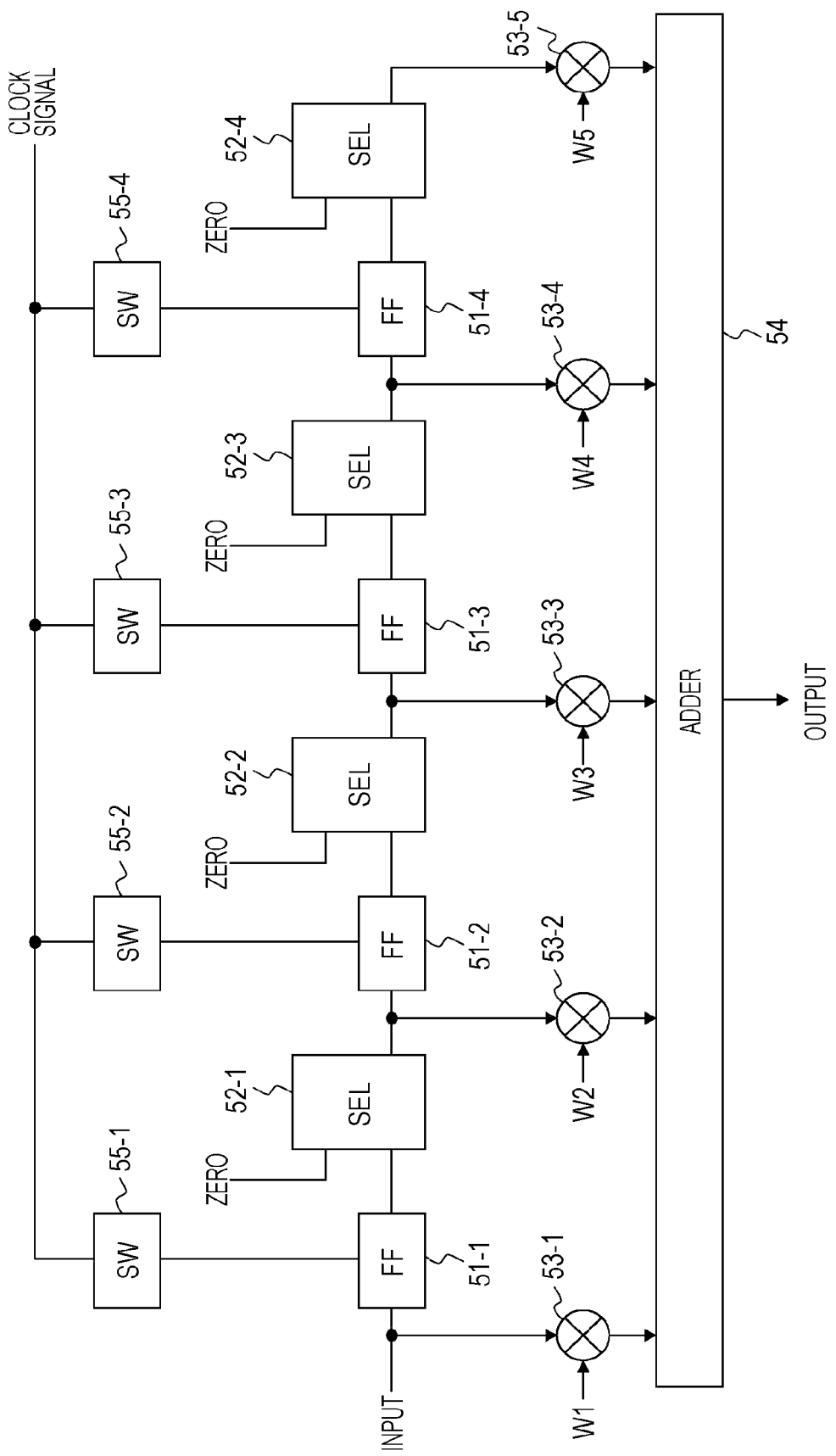
FIG. 13 is a diagram illustrating an example of optimization of the parameters of the optical receiver.

FIG. 13 illustrates an example of optimization of the parameters of the optical receiver 3. In this example, the number of taps of an FIR filter is optimized.

The FIR filter illustrated in FIG. 13 corresponds to an example of the FIR filters 24a to 24d in the equalizer 24 illustrated in FIG. 8. In FIG. 13, although the number of taps of the FIR filter is five for ease of explanation, the FIR filter used in the equalizer 24 actually has a larger number of taps.

As illustrated in FIG. 13, the FIR filter includes flip-flop circuits 51-1 to 51-4, selectors 52-1 to 52-4, multipliers 53-1 to 53-5, an adder 54, and switches 55-1 to 55-4.

The flip-flop circuits 51-1 to 51-4 constitute a shift register circuit. For example, if the FIR filter in FIG. 13 is the FIR filter 24a illustrated in FIG. 8, a symbol string of the H-polarization signal is sequentially input to the shift register circuit. The selectors 52-1 to 52-4 each select the output signal of a corresponding one of the flip-flop circuits 51-1 to 51-4 or "zero". The output signals of the selectors 52-1 to 52-3 are guided to the flip-flop circuits 51-2 to 51-4, respectively.

The multiplier 53-1 multiplies the input signal to the flip-flop circuit 51-1 by a tap coefficient W1. The flip-flop circuits 51-2 to 51-5 multiply the output signals from the selectors 52-1 to 52-4 by tap coefficients W2 to W5, respectively. The adder 54 calculates the sum total of the output values of the multipliers 53-1 to 53-5 and outputs the sum total. The switches 55-1 to 55-4 each control supply of a clock signal to a corresponding one of flip-flop circuits 51-1 to 51-4.

In the above-configured FIR filter, the selectors 52-1 to 52-4 and the switches 55-1 to 55-4 are controlled by, for example, the controller 28. The controller 28 determines the number of taps of the FIR filter on the basis of the polarization-dependent characteristic of the optical transmission line 4. In this example, the controller 28 determines the number of taps of the FIR filter on the basis of the maximum DGD of the optical transmission line 4 determined in the process of the flowchart in FIG. 10.

If the maximum DGD is large, it is preferable to increase the number of taps of the FIR filter to improve the characteristic degraded in the optical transmission line 4. In contrast, if the maximum DGD is small, the equalizer 24 can improve the characteristic degraded in the optical transmission line 4 even if the number of taps of the FIR filter is small. Accordingly, if the maximum DGD is small, it is preferable to decrease the number of taps of the FIR filter to reduce the power consumption of the equalizer 24.

If the maximum DGD is large, the controller 28 sets the numbers of taps of the individual FIR filters of the equalizer 24 to, for example, five. Specifically, the controller 28 controls the selectors 52-1 to 52-4 and the switches 55-1 to 55-4 of the individual FIR filters as follows:

(1) The selectors 52-1 to 52-4 select the output signals of the flip-flop circuits 51-1 to 51-4, respectively.

(2) The switches 55-1 to 55-4 are in an on-state.

In this case, the flip-flop circuits 51-1 to 51-4 operate as a shift register circuit. Accordingly, continuous five symbols are multiplied by the tap coefficients W1 to W5, respectively. The sum total of the five products obtained by the multipliers 53-1 to 53-5 is output.

If the maximum DGD is small, the controller 28 sets the numbers of taps of the individual FIR filters of the equalizer 24 to, for example, three. Specifically, the controller 28 controls the selectors 52-1 to 52-4 and the switches 55-1 to 55-4 of the individual FIR filters as follows:

(1) The selectors 52-1 and 52-2 select the output signals of the flip-flop circuits 51-1 and 51-2, respectively.

(2) The selectors 52-3 and 52-4 individually select "0".

(3) The switches 55-1 and 55-2 are in an on-state.

(4) The switches 55-3 and 55-4 are in an off-state.

In this case, the multipliers 53-1 to 53-3 multiply the input symbols by the tap coefficients W1 to W3, respectively. Then, the sum total of the three products obtained by the multipliers 53-1 to 53-3 is output. In other words, "the number of taps=3" is achieved. On the other hand, the flip-flop circuits 51-3 to 51-4 are supplied with no clock signal. Accordingly, the power consumption of the shift register circuit can be reduced. Since the selectors 52-3 and 52-4 individually select "0", the outputs of the multipliers 53-4 and 53-5 are also "0".

Figure 14:
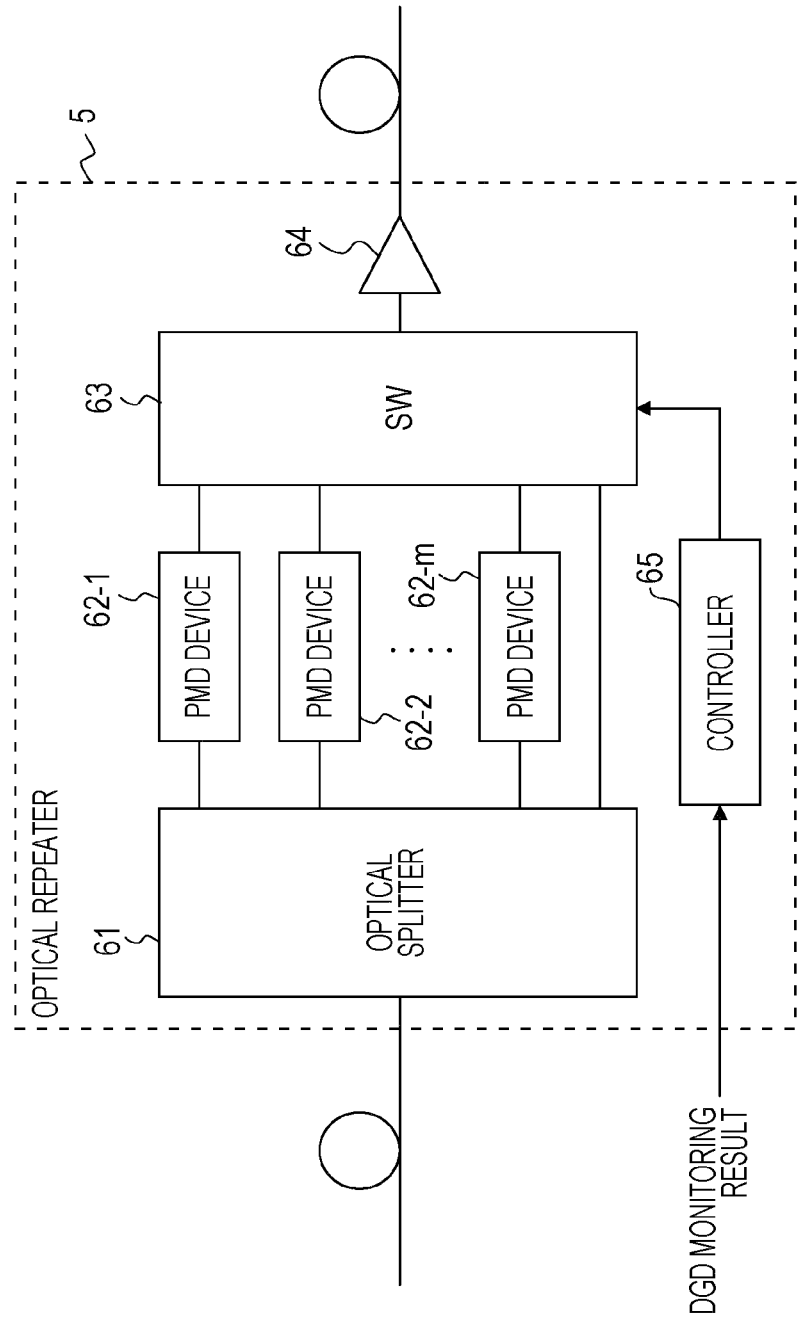
FIG. 14 is a diagram illustrating an example of optimization of the parameters of the optical repeater.

FIG. 14 illustrates an example of optimization of the parameters of the optical repeater 5. In this example, a DGD added to the optical transmission line 4 is optimized by the optical repeater 5.

In the optical transmission system 1, there is a limit to the DGD resistance of the optical receiver 3. Therefore, if the DGD between the optical transmitter 2 and the optical receiver 3 exceeds the DGD resistance of the optical receiver 3, the communication quality is degraded. On the other hand, if the DGD between the optical transmitter 2 and the optical receiver 3 is large, the nonlinear penalty decreases. Thus, the optical transmission system 1 has a trade-off for the DGD.

Accordingly, in the optical transmission system 1, the total DGD between the optical transmitter 2 and the optical receiver 3 is adjusted in consideration of both the DGD resistance of the optical receiver 3 and the nonlinear penalty. At this time, the optical transmission system 1 adjusts a DGD to be added to the optical transmission line 4 in the optical repeater 5 so that the total DGD between the optical transmitter 2 and the optical receiver 3 falls within a predetermined range. Here, the predetermined range is determined so that, for example, the nonlinear penalty is sufficiently suppressed and the total DGD is lower than the DGD resistance of the optical receiver 3.

As illustrated in FIG. 14, the optical repeater 5 includes an optical splitter 61, PMD devices 62-1 to 62-$m$, an optical switch 63, an optical amplifier 64, and a controller 65. As illustrated in FIG. 1, the optical repeater 5 is provided in the optical transmission line 4 of the optical transmission system 1.

The optical splitter 61 splits the input optical signal and guides the signals to the PMD devices 62-1 to 62-$m$ and to the optical switch 63. The PMD devices 62-1 to 62-$m$ have different DGD values from each other. The PMD devices 62-1 to 62-$m$ are implemented by, for example, optical fibers with different lengths. The optical switch 63 selects one of the plurality of input optical signals in accordance with an instruction from the controller 65. The optical amplifier 64 amplifies the optical signal selected by the optical switch 63.

The controller 65 controls the optical switch 63 on the basis of the DGD value measured by the DGD monitor 27 of the optical receiver 3. At this time, the controller 65 controls the optical switch 63 so that the total DGD between the optical transmitter 2 and the optical receiver 3 falls within a predetermined range. This allows the nonlinear penalty of the optical transmission system 1 to be suppressed while keeping the total DGD of the optical transmission system 1 lower than the DGD resistance of the optical receiver 3.

In the above embodiment, when the optical receiver 3 monitors the DGD, the optical transmitter 2 transmits an unmodulated optical signal. In this case, if the optical transmitter 2 transmits a high-power optical signal, reflection in the optical fiber increases due to stimulated Brillouin scattering (SBS).

To suppress the reflection, the optical transmission system 1 may superimpose a dithering signal corresponding to ms ($\tau$) in FIG. 4 on the optical signal during the operation of the DGD monitor 27. In this case, the frequency controller 13 superimposes the frequency dithering signal on the input signal by minutely varying the frequency adjustment amount $\Delta f$. Preferably, the modulation speed (that is, the dithering frequency) of the frequency dithering signal is sufficiently lower than the DGD measurement time. Furthermore, it is preferable that the modulation amplitude of the dithering signal be sufficiently smaller than the frequency resolution of DGD measurement.

In the above embodiment, although the optical transmission system 1 measures the DGD (or PMD) as one of parameters indicating the polarization state of the optical transmission line 4, it is not limited to this embodiment. The optical transmission system 1 may measure another parameter (for example, PDL) indicating the polarization state of the optical transmission line 4.

According to the above aspect, a characteristic that depends on the polarization state of the optical transmission line can be measured in a short time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method for monitoring, in an optical transmission system comprising an optical transmitter and an optical receiver, a polarization-dependent characteristic of an optical transmission line between the optical transmitter and the optical receiver, the method comprising:

sweeping an optical frequency of an optical signal by the optical transmitter by controlling an electric-field information signal corresponding to a transmitted signal by digital-signal processing;

providing a plurality of different transmission polarization states for individual frequencies of the optical signal by the optical transmitter by controlling a mixture of a first electric-field information signal corresponding to a first transmitted signal and a second electric-field information signal corresponding to a second transmitted signal by digital-signal processing;

obtaining, for individual frequencies of the optical signal, a plurality of polarization-dependent characteristics corresponding to the plurality of different frequencies, when the optical transmitter sweeps the frequency of the optical signal, by the optical receiver by calculating a polarization-dependent characteristic of an optical transmission line between the optical transmitter and the optical receiver, based on a plurality of items of received-electric-field information corresponding to the plurality of different transmission polarization states by digital-signal processing; and obtaining statistical information of a polarization state of the optical transmission line, based on the plurality of polarization-dependent characteristics, with the optical receiver by digital-signal processing.

2. An optical transmission system, comprising:
an optical transmitter; and
an optical receiver,
wherein the optical transmitter includes:
a first digital-signal processor configured to generate an electric-field information signal corresponding to a transmitted signal; and
a transmitter front-end section configured to generate an optical signal from the electric-field information signal, the optical receiver includes:
a receiver front-end section configured to generate an electric-field information signal corresponding to the optical signal; and
a second digital-signal processor configured to process the electric-field information signal,
wherein the first digital-signal processor includes:
a frequency controller configured to sweep a frequency of the optical signal by controlling the electric-field information signal; and
a polarization controller configured to control a polarization state of the optical signal by controlling a mixture of a first electric-field information signal corresponding to a first transmitted signal and a second electric-field information signal corresponding to a second transmitted signal, wherein
when the frequency controller sweeps the frequency of the optical signal, the polarization controller provides a plurality of different transmission polarization states for individual frequencies of the optical signal, and wherein when the first digital-signal processor sweeps the frequency of the optical signal, the second digital-signal processor obtains, for individual frequencies of the optical signal, a plurality of polarization-dependent characteristics corresponding to the plurality of different frequencies of the optical signal by calculating a polarization-dependent characteristic of an optical transmission line between the optical transmitter and the optical receiver, based on a plurality of items of received-electric-field information corresponding to the plurality of different transmission polarization states; and the second digital-signal processor obtains statistical information of the polarization-dependent characteristic of the optical transmission line, based on the plurality of polarization-dependent characteristics.

3. The optical transmission system according to claim 2, wherein the second digital-signal processor obtains a plurality of differential group delay ("DGD") values by calculating a DGD of the optical transmission line for the plurality of different frequencies of the optical signal; and the second digital-signal processor calculates a statistical distribution of the DGDs of the optical transmission line, a maximum value, or a variation range of the DGD of the optical transmission line based on the plurality of DGD values.

4. The optical transmission system according to claim 2, wherein the frequency controller controls the frequency of the optical signal by correcting an I-component and a Q-component of the electric-field information signal corresponding to the transmitted signal.

5. The optical transmission system according to claim 2, wherein the frequency controller superimposes a frequency dithering signal on the electric-field information signal.

6. The optical transmission system according to claim 2, wherein when the second digital-signal processor monitors a state of the optical transmission line, the first digital-signal processor generates an electric-field information signal corresponding to a transmitted signal in which the values of symbols are fixed.

7. The optical transmission system according to claim 2, wherein the second digital-signal processor comprises:
- a digital filter configured to shape a waveform of an electrical signal generated by the receiver front-end section; and
- a controller configured to determine a number of taps of the digital filter, based on the statistical information of the polarization-dependent characteristic of the optical transmission line.

8. The optical transmission system according to claim 2, further comprising:
- an optical repeater on the optical transmission line between the optical transmitter and the optical receiver,
- wherein the optical repeater controls a DGD to be added to the optical transmission line, based on the statistical information of the polarization-dependent characteristic of the optical transmission line so that a DGD between the optical transmitter and the optical receiver falls within a predetermined range.

* * * * *